United States Patent
Weis et al.

(10) Patent No.: US 10,224,785 B2
(45) Date of Patent: Mar. 5, 2019

(54) COOLING SYSTEM FOR A DYNAMOELECTRIC MACHINE

(71) Applicant: Schaeffler Technologies AG & CO. KG, Herzogenaurach (DE)

(72) Inventors: Johannes Weis, Fuerth (DE); Christian Schaefer, Nuremberg (DE); Stefan Mackowiak, Malsch (DE); Sebastian Heitz, Niederschaeffolsheim (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 308 days.

(21) Appl. No.: 14/903,536

(22) PCT Filed: Jun. 12, 2014

(86) PCT No.: PCT/DE2014/200256
§ 371 (c)(1),
(2) Date: Jan. 7, 2016

(87) PCT Pub. No.: WO2015/003697
PCT Pub. Date: Jan. 15, 2015

(65) Prior Publication Data
US 2016/0172940 A1    Jun. 16, 2016

(30) Foreign Application Priority Data
Jul. 9, 2013 (DE) .......... 10 2013 213 435

(51) Int. Cl.
*H02K 9/19* (2006.01)
*H02K 5/20* (2006.01)

(52) U.S. Cl.
CPC .......... *H02K 9/19* (2013.01); *H02K 5/20* (2013.01)

(58) Field of Classification Search
CPC .......... H02K 5/20; H02K 9/19
(Continued)

(56) References Cited

U.S. PATENT DOCUMENTS

| 6,909,210 B1 * | 6/2005 | Bostwick | H02K 5/20 310/254.1 |
| 6,960,851 B2 * | 11/2005 | Poulin | H02K 9/19 310/52 |

(Continued)

FOREIGN PATENT DOCUMENTS

| CN | 201570947 U | 9/2010 |
| CN | 201869031 U | 6/2011 |

(Continued)

*Primary Examiner* — Alexander Talpalatski
(74) *Attorney, Agent, or Firm* — Davidson, Davidson & Kappel, LLC

(57) ABSTRACT

A cooling system for a dynamoelectric machine comprising a cooling jacket for assembly on an outer circumference of a stator of the dynamoelectric machine, a housing for receiving the stator having the mounted cooling jacket such that a hollow chamber, which can be filled with a liquid cooling medium, remains between an outer wall of the cooling jacket and an inner wall of the housing, wherein an inlet opening for inlet of the cooling medium into an inlet region and an outlet opening for outlet of the cooling medium from an outlet region of the hollow chamber are arranged on the housing and a barrier element connected to the cooling jacket for spatial separation of the inlet region from the outlet region is provided. The efficiency of such a cooling system is improved in that the barrier element presses against the inner wall of the housing having increasing pressure difference of the cooling medium in the inlet and outlet region.

12 Claims, 2 Drawing Sheets

(58) Field of Classification Search
USPC .......................................................... 310/52
See application file for complete search history.

(56) References Cited

U.S. PATENT DOCUMENTS

| | | | | |
|---|---|---|---|---|
| 7,402,924 | B2 * | 7/2008 | Bibeau | H02K 5/20 |
| | | | | 310/216.136 |
| 7,474,021 | B2 * | 1/2009 | Perrin | H02K 9/22 |
| | | | | 310/52 |
| 7,948,126 | B2 | 5/2011 | Fulton et al. | |
| 7,965,002 | B2 * | 6/2011 | Savant | H02K 5/20 |
| | | | | 310/52 |
| 8,487,489 | B2 * | 7/2013 | Palafox | H02K 3/24 |
| | | | | 310/52 |
| 9,472,995 | B2 | 10/2016 | Liu et al. | |
| 2007/0007830 | A1 * | 1/2007 | Reisch | H02K 7/006 |
| | | | | 310/54 |
| 2007/0075595 | A1 * | 4/2007 | Narayanan | H02K 5/20 |
| | | | | 310/52 |
| 2010/0001597 | A1 * | 1/2010 | Noll | H02K 5/20 |
| | | | | 310/58 |

FOREIGN PATENT DOCUMENTS

| | | | |
|---|---|---|---|
| CN | 102355080 | 2/2012 | |
| CN | 103023219 | 4/2013 | |
| DE | 19624519 | 1/1998 | |
| DE | 19854464 A1 | 12/1999 | |
| DE | 19854466 C1 | 4/2000 | |
| DE | 102008014386 | 9/2008 | |
| DE | 102008014386 A1 * | 9/2008 | ............... H02K 5/20 |

* cited by examiner

COOLING SYSTEM FOR A DYNAMOELECTRIC MACHINE

The present invention relates to a cooling system for a dynamoelectric machine. The present invention also relates to a dynamoelectric machine which includes a cooling system of this type.

BACKGROUND

Particularly when the objective is a compact design and a high energy density of an electric drive associated therewith, liquid cooling is generally used to cool dynamoelectric machines. A typical area of application, in which the compact design of an electric drive plays a particularly large role, is electromobility. Due to the limited installation space in the motor vehicle, the objective is a particularly high power density of the traction machine used for the drive.

An electric machine which includes a liquid cooling system is thus known from DE102008014386A1, which has the features according to the definition of the species in Patent claim 1. To cool the stator, a cooling jacket is mounted on its outer circumference. A housing for accommodating the stator, including the mounted cooling jacket, is situated at a radial distance from the coolant. A cavity, through which a cooling medium may flow in the circumferential direction, is situated between the housing and the cooling jacket.

In the cooling system known from DE102008014386A1, it is proposed to separate an inlet hole for the cooling medium from an outlet hole with the aid of a detent plate, for the purpose of transporting a flow of cooling fluid 360 degrees around a circumference of the cavity.

The cooling jacket is generally connected to the stator in the form of an interference fit. This ensures a good heat transfer from the stator laminated core to the cooling jacket. The interference fit furthermore ensures the transmission of the torque to the load-bearing elements.

In known dynamoelectric machines, the cooling jacket and the housing are generally not manufactured from the same material. Likewise, different thermal expansion coefficients also result for these two components. As a result, the stator provided with the cooling jacket may form an interference fit together with the housing at room temperature, but this interference fit transitions to a clearance fit as the temperature rises during operation of the electric machine.

SUMMARY OF THE INVENTION

It is an object of the present invention to cost-effectively facilitate an effective cooling of dynamoelectric machines in all operating states.

The present invention provides a cooling system for a dynamoelectric machine. The cooling system includes a cooling jacket, which is provided for mounting on an outer circumference of a stator laminated core of a dynamoelectric machine. A mounting of this type takes place, in particular, in the form of a press fit, for example using a thermal shrinkage process.

The cooling system also has a housing for accommodating the stator, including the mounted cooling jacket. After the accommodation of the stator provided with the cooling jacket, a cavity remains between the outer wall of the cooling jacket and an inner wall of the housing in the radial direction. This cavity is used to accommodate a liquid cooling medium during the operation of the dynamoelectric machine.

The housing also includes an inlet opening for admitting the cooling medium into an inlet area and an outlet opening for discharging the cooling medium from an outlet area of the cavity. A barrier element, which runs, in particular, in the axial direction and separates the inlet area from the outlet area, is situated between the aforementioned inlet area and the outlet area.

The system may be advantageously designed in such a way that the cooling medium introduced into the cavity through the inlet opening flows through the cavity almost completely around the stator in the circumferential direction and finally leaves the cavity at the outlet opening, for example to dissipate the absorbed heat to an external heat exchanger.

To prevent the cooling medium from flowing directly from the inlet opening to the outlet opening via the shortest route, without flowing around the complete stator of the dynamoelectric machine, the inlet and outlet areas are spatially separated from each other by the barrier element connected to the cooling jacket.

The present invention is now based on the finding that a barrier element of this type, which is known from the prior art and is fixedly connected to the cooling jacket, is not a secure detent between the inlet area and the outlet area of the cooling medium in every operating state. Instead, leaks frequently occur, for example when the connection between the cooling jacket and the housing forms a clearance fit due to heating of the electric machine.

In particular, to ensure optimum cooling in an operating situation of this type, the present invention therefore proposes that the barrier element is designed in such a way that it presses against the inner wall of the housing as the pressure difference of the cooling medium in the inlet and outlet areas increases. In other words, the barrier element has a sealing function which increases along with the pressure difference of the cooling medium in the inlet and outlet areas, whereby a leakage flow along the housing inner wall is reliably avoided.

In one advantageous embodiment of the present invention, a sealing function induced by the pressure difference may be implemented, for example, by the fact that the barrier element clings to the inner wall of the housing in the direction of the inlet area on an end facing the housing. This effectively prevents a leakage flow between the radially outer end of the barrier element and the inner wall of the housing as the clearance fit increases. Since the barrier forms an equally effective seal between the housing and the cooling jacket with a press fit and a clearance fit, the cooling system is very easy to dimension compared to the prior art. Without the addressed pressure-dependent sealing function, however, with a clearance fit between these two elements, a leakage flow of cooling fluid always occurs, which depends on the operating state of the electric machine and is correspondingly difficult to take into account in the design of the cooling system.

In another advantageous embodiment of the present invention, the sealing function is particularly easy to achieve by the fact that the barrier element has an elastic structure at least in the area of the end facing the housing, which may be pressed against the inner wall of the housing by the aforementioned pressure difference. An elastic element of this type may be, for example, a soft rubber lip, which compensates for the clearance between the housing and the cooling jacket under extreme conditions.

A barrier element which is designed as an injection-molded part is particularly cost-effective to manufacture. In one advantageous embodiment of the present invention, for example, an element of this type may be glued onto the cooling jacket.

A particularly elastic material is suitable in particular for implementing the sealing function in the radially outer part of the barrier element. However, a force resulting from the pressure difference between the inlet and outlet areas acts upon the barrier element in the circumferential direction of the cooling jacket and makes it necessary for the barrier element to have a certain strength to firmly hold the latter in a fixed position on the cooling jacket and to avoid an inadvertent deformation of the entire barrier element. To achieve this, an embodiment of the present invention is advantageous in which the barrier element includes a base element, which is fastened to the cooling jacket and is made of a less elastic material than the end facing the housing.

To fasten the barrier element on the cooling jacket, a form-locked connection is also possible as an alternative to an integral connection and also encompasses the latter in one advantageous embodiment of the present invention.

In one particularly advantageous embodiment of the present invention, the barrier element has at least one leakage opening on its end facing the cooling jacket, through which part of the cooling medium is able to flow from the inlet area to the outlet area. A leakage flow between the inlet and outlet areas is induced in a targeted manner through the leakage opening. This specific embodiment is based on the finding that flow barriers provided in cooling jackets generally represent a downright weak point in the cooling of dynamo-electric machines. Local hot spots frequently form below barrier elements of this type, since the cooling fluid at these points is unable to dissipate any heat. However, the problem of the hot spots is avoided by the leakage openings in the lower area of the barrier elements. The at least one leakage opening is situated in such a way that the leakage flow of the coolant touches the outer wall of the cooling jacket radially below the barrier when it passes through the barrier and thus through the leakage opening. As a result, a cooling below the barrier is effectively effectuated by the leakage flow. According to the prior art, however, the clearance fit-dependent leakage flow flows past the inner wall of the housing above the barrier, where it is unable to contribute to the cooling of the dynamoelectric machine.

In one advantageous embodiment of the present invention not only one leakage opening but multiple leakage openings, distributed over the axial length of the barrier element, are provided, so that the leakage flow is distributed axially over the complete length of the machine. When calculating the number of openings and the size of the openings, the fact that the leakage flow as a whole reduces the flow rate of the cooling medium along the main flow must be taken into account.

In one advantageous embodiment of the present invention, a chamfer on the barrier element on at least one front side of the cooling jacket assists with the insertion of the stator provided with the cooling jacket into the housing.

BRIEF DESCRIPTION OF THE DRAWINGS

The present invention is described in greater detail below on the basis of specific embodiments illustrated in the figures. Elements having the same functions are provided with the same reference numerals in the figures.

DETAILED DESCRIPTION

Figure 1:
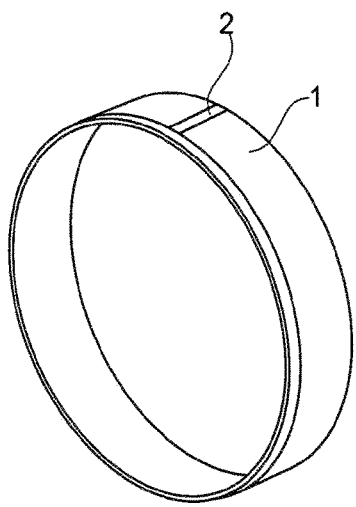
FIG. 1 shows a cooling jacket including a barrier element according to one embodiment of the present invention.
Figure 2:
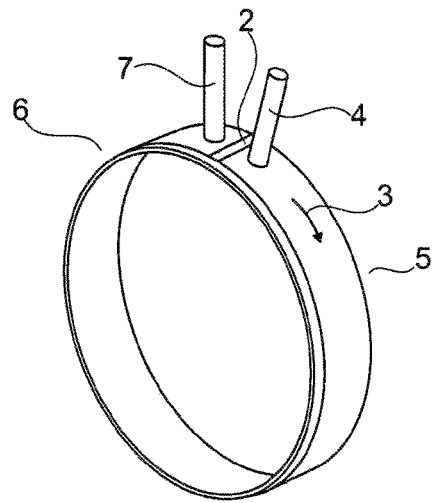
FIG. 2 shows a coolant flow along the cooling jacket from FIG. 1.

FIG. 1 shows a cooling jacket 1 including a barrier element 2 according to one embodiment of the present invention. FIG. 2 shows a coolant flow 3, which, in one specific embodiment of the present invention, is essentially oriented in the circumferential direction of a stator of an electric machine. The coolant flow is delimited radially on the inside by the outer wall of cooling jacket 1 and radially on the outside by the inner wall of a housing, which surrounds cooling jacket 1 and is not illustrated here. The coolant is first admitted into an inlet area 5 of the cavity through an inlet opening 4, which is illustrated only schematically here. Coolant flow 3 now flows from inlet area 5 along the circumference of the electric machine without reversing direction to outlet area 6, from where it flows out of the cavity through outlet opening 7. Between inlet opening 4 and outlet opening 7, barrier element 2 prevents coolant flow 3 from flowing from inlet opening 4 to outlet opening 7 over the shortest route and thus not passing around the complete circumference of the machine.

Barrier element 2 is fixedly connected to cooling jacket 1. Cooling jacket 1 is shrunk onto a stator laminated core of the dynamoelectric machine. The stator laminated core is then placed in a housing together with cooling jacket 1 and barrier element 2 fastened thereto.

Figure 3:
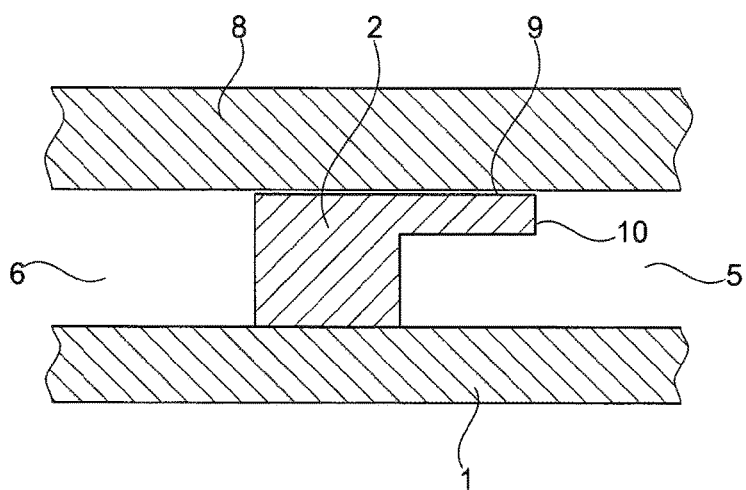
FIG. 3 shows a cross sectional view of a cavity in the area of a barrier element.

FIG. 3 shows a cross sectional view of a cavity in the area of a barrier element 2. Barrier element 2 is situated between inlet area 5 and outlet area 6 of the cavity. A state is illustrated, in which no coolant flow takes place, and therefore also no pressure difference exists between inlet area 5 and outlet area 6. The cavity, which is delimited by a housing 8 and cooling jacket 1 in the radial direction, has a width in the radial direction which is greater than the extension of barrier element 2 in the radial direction. As a result, a clearance fit, which results in a gap 9 radially above barrier element 2, prevails between cooling jacket 1 and barrier element 2 fastened thereto and housing 8. However, this gap 9 only exists as long as no pressure difference is present between inlet area 5 and outlet area 6. If a coolant flow is forced, however, the pressure in inlet area 5 is greater than in outlet area 6.

The barrier element has a certain elasticity on its end 10 facing housing 8, which makes it possible to press aforementioned end 10 against the inner wall of housing 8, so that end 10 clings thereto and seals gap 9. This clinging action is triggered by the fact that the pressure in inlet area 5 is greater than the pressure in outlet area 6. Pressure ratios of this type, however, automatically occur, for example, once the coolant flow is forced from inlet opening 4 to outlet opening 7 by a pump.

Figure 4:
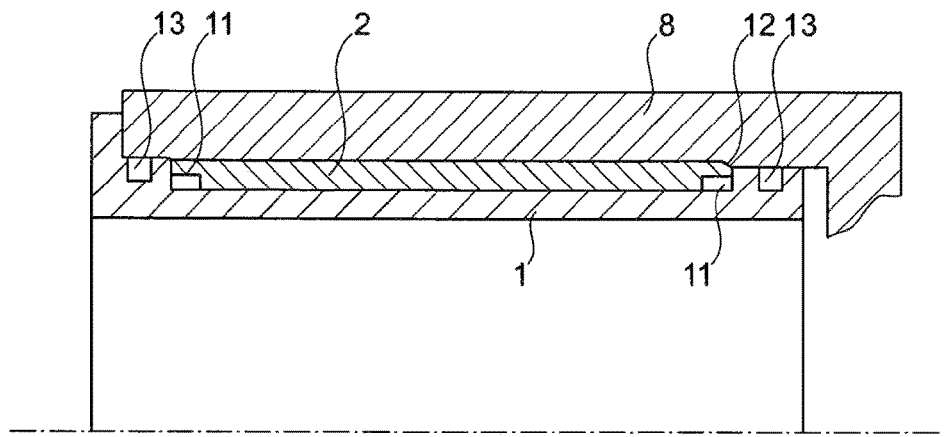
FIG. 4 shows a longitudinal sectional view of a cavity in the area of the barrier element according to FIG. 3.

FIG. 4 shows a longitudinal sectional view of a cavity in the area of barrier element 2 according to FIG. 3. Barrier element 2 has two leakage openings 11 on its end oriented radially inward. They form a bypass between inlet area 5 and outlet area 6. In this way, a defined leakage flow passes directly from inlet opening 4 to outlet opening 7 below barrier element 2 without running around the complete circumference of the machine.

Leakage openings 11 effectuate a cooling of the machine below barrier element 2 and, in this way, prevent dangerous hot spots.

Barrier element 2 also includes a chamfer 12 on one front end, which makes it easier to mount cooling jacket 1 in housing 8. The leakage occurring as a result of this chamfer 12 is negligible with respect to the design of the coolant circuit.

Figure 5:
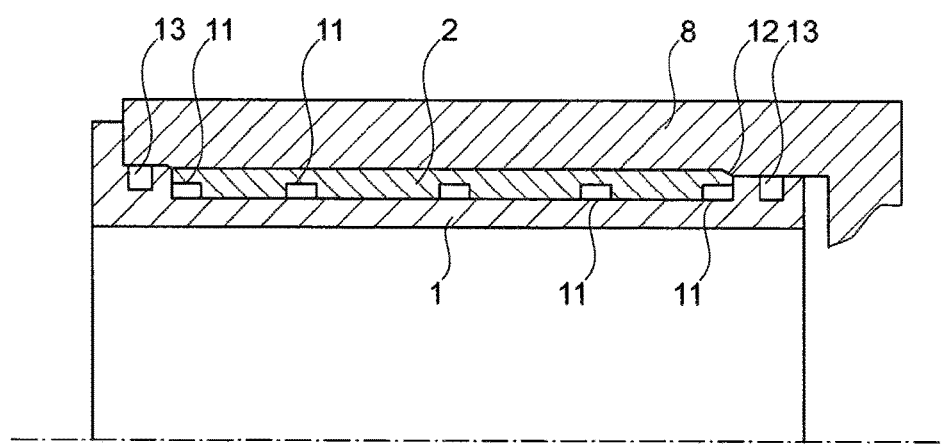
FIG. 5 shows a longitudinal sectional view of a cavity including a barrier element in another embodiment of the present invention.

FIG. 5 shows a longitudinal sectional view of a cavity including a barrier element 2 in another embodiment of the present invention. In contrast to the embodiment according to FIG. 4, multiple leakage openings 11 distributed in the axial direction along barrier element 2 are provided in this case. In this way, the leakage flow is increased compared to that in the embodiment according to FIG. 4. However, the cooling below barrier element 2 is in return improved, since a cooling of the stator is now effectuated at multiple points below barrier element 2.

In FIGS. 4 and 5, reference numeral 13 designates grooves into which O-rings are inserted for sealing cooling jacket 1 with respect to housing 8.

LIST OF REFERENCE NUMERALS 1 cooling jacket
2 barrier element
3 coolant flow
4 inlet opening
5 inlet area
6 outlet area
7 outlet opening
8 housing
9 gap
10 end of the barrier element facing the housing
11 leakage openings
12 chamfer
13 grooves

What is claimed is:

1. A cooling system for a dynamoelectric machine, comprising:
a cooling jacket for mounting on an outer circumference of a stator of the dynamoelectric machine;
a housing for accommodating the stator and the mounted cooling jacket, in such a way that a cavity fillable with a liquid cooling medium remains between an outer wall of the cooling jacket and an inner wall of the housing, an inlet opening for admitting the cooling medium into an inlet area, and an outlet opening for discharging the cooling medium from an outlet area of the cavity, being situated on the housing; and
a barrier element connected to the cooling jacket for spatially separating the inlet area from the outlet area;
wherein the barrier element is designed in such a way as to be forced radially outward to press against the inner wall of the housing in response to a pressure difference of the cooling medium wherein the pressure in the inlet area is greater than the pressure in the outlet area, the barrier element clinging to the inner wall of the housing in the direction of the inlet area on an end facing the housing and having an elastic structure at least in an area of the end facing the housing, the elastic structure pressable radially outward against the inner wall of the housing via the pressure difference.

2. The cooling system as recited in claim 1 wherein the barrier element has a base element fastened to the cooling jacket and made of a less elastic material than the end facing the housing.

3. The cooling system as recited in claim 1 wherein the barrier element is an injection-molded part glued to the cooling jacket.

4. The cooling system as recited in claim 1 wherein the barrier element is connected to the cooling jacket in a form-locked manner.

5. The cooling system as recited in claim 1 wherein the cooling jacket and the housing have different thermal expansion coefficients, so that a clearance fit is present between the cooling jacket mounted on the stator and the housing at an operating temperature of the electric machine.

6. The cooling system as recited in claim 1 wherein the barrier element has at least one leakage opening on an end facing the cooling jacket, part of the cooling medium being able to flow from the inlet area to the outlet area through the leakage opening.

7. The cooling system as recited in claim 1 wherein the barrier element includes a chamfer on at least one front side of the cooling jacket for easier mounting of the cooling jacket in the housing.

8. A dynamoelectric machine comprising the cooling system as recited in claim 1.

9. The dynamoelectric machine as recited in claim 8 wherein the cooling jacket is mounted in the form of an interference fit on the outer circumference of the stator of the machine.

10. The cooling system as recited in claim 1 wherein the barrier element is designed in such a way to be spaced in a radial direction by a gap from the inner wall of the housing as no pressure difference exists between the inlet area and the outlet area.

11. A cooling system for a dynamoelectric machine, comprising:
a cooling jacket for mounting on an outer circumference of a stator of the dynamoelectric machine;
a housing for accommodating the stator and the mounted cooling jacket, in such a way that a cavity fillable with a liquid cooling medium remains between an outer wall of the cooling jacket and an inner wall of the housing, an inlet opening for admitting the cooling medium into an inlet area, and an outlet opening for discharging the cooling medium from an outlet area of the cavity, being situated on the housing; and
a barrier element connected to the cooling jacket for spatially separating the inlet area from the outlet area;
wherein the barrier element is designed in such a way to press against the inner wall of the housing as the pressure difference of the cooling medium in the inlet and outlet areas increases, the pressure in the inlet area being greater than the pressure in the outlet area, the barrier element clinging to the inner wall of the housing in the direction of the inlet area on an end facing the housing and having an elastic structure at least in an area of the end facing the housing, the elastic area pressable against the inner wall of the housing via the pressure difference,
wherein the barrier element has a base element fastened to the cooling jacket and made of a less elastic material than the end facing the housing.

12. A cooling system for a dynamoelectric machine, comprising:
a cooling jacket for mounting on an outer circumference of a stator of the dynamoelectric machine;
a housing for accommodating the stator and the mounted cooling jacket, in such a way that a cavity fillable with a liquid cooling medium remains between an outer wall of the cooling jacket and an inner wall of the housing, an inlet opening for admitting the cooling medium into an inlet area, and an outlet opening for discharging the cooling medium from an outlet area of the cavity, being situated on the housing; and a barrier element connected to the cooling jacket for spatially separating the inlet area from the outlet area;

wherein the barrier element is designed in such a way to press against the inner wall of the housing as the pressure difference of the cooling medium in the inlet and outlet areas increases, the pressure in the inlet area being greater than the pressure in the outlet area, the barrier element clinging to the inner wall of the housing in the direction of the inlet area on an end facing the housing and having an elastic structure at least in the area of an end facing the housing, the elastic area pressable against the inner wall of the housing via the pressure difference, wherein the barrier element is an injection-molded part glued to the cooling jacket.

* * * * *